United States Patent [19]

Schlueter et al.

[11] Patent Number: 5,099,175
[45] Date of Patent: Mar. 24, 1992

[54] TUNABILITY ENHANCED ELECTROMAGNETIC WIGGLER

[75] Inventors: Ross D. Schlueter, Albany; Gary A. Deis, Livermore, both of Calif.

[73] Assignee: The United States of America as represented by the United States Department of Energy, Washington, D.C.

[21] Appl. No.: 672,308

[22] Filed: Mar. 20, 1991

[51] Int. Cl.⁵ ............................................. H01J 25/00
[52] U.S. Cl. .............................................. 315/4; 315/3; 315/5; 315/5.35; 372/2
[58] Field of Search ................................ 315/3–5, 315/5.35; 372/2

[56] References Cited

U.S. PATENT DOCUMENTS

| H450 | 3/1988 | Halbach | 315/4 |
|---|---|---|---|
| 4,018,492 | 9/1975 | Eckart . | |
| 4,530,096 | 7/1985 | Bekefi et al. . | |
| 4,542,510 | 9/1985 | Black, Jr. . | |
| 4,599,724 | 7/1986 | McMillin . | |
| 4,679,197 | 7/1987 | Hsu . | |
| 4,761,584 | 8/1988 | Halbach | 315/5 |
| 4,819,238 | 4/1989 | Harvey . | |
| 4,862,128 | 8/1989 | Leupold | 315/5.35 |
| 4,876,687 | 10/1989 | Feinstein . | |

Primary Examiner—Léon Scott, Jr.
Attorney, Agent, or Firm—Henry P. Sartorio; L. E. Carnahan; William R. Moser

[57] ABSTRACT

The invention discloses a wiggler used in synchrotron radiation sources and free electron lasers, where each pole is surrounded by at least two electromagnetic coils. The electromagnetic coils are energized with different amounts of current to provide a wide tunable range of the on-axis magnetic flux density, while preventing magnetic saturation of the poles.

17 Claims, 11 Drawing Sheets

TUNABILITY ENHANCED ELECTROMAGNETIC WIGGLER

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

Free electron lasers are able to produce very high power laser radiation in an efficient manner. In addition to their high efficiency and high power capability, they are attractive since they can be tunable over a wide spectrum from millimeter wavelengths to the x-ray region. Free electron lasers pass a relativistic electron beam through a spatially varying magnetic field called a wiggler, which wiggles the electrons in the electron beam. The wiggle of the electrons cause the electrons to radiate. If the proper phase is maintained by the electron beam, the radiation produced can amplify an existing electromagnetic field creating a laser beam. Tuning the wiggler so that the electrons emit light of a desired wavelength and so that the light can be efficiently extracted from the electron beam, comprises adjusting the magnetic field strength in the wiggler.

There are other applications for wigglers, such as third generation synchrotron radiation rings. These synchrotron radiation rings employ wigglers to increase radiation power output and expand or customize the wavelength spectrum of the radiation produced. In the claims and specification the word "wiggler" will also include those wigglers called undulators producing narrowly peaked radiation spectrums.

FIG. 1 is a schematic drawing of a relativistic electron beam passing through a wiggler to produce directed radiation. Alternating magnetic poles 12 are used to create an alternating magnetic field $B_w$, which in the x-z plane is parallel and antiparallel to the y axis. An electron beam 10 is directed along the z axis through the alternating magnetic field. The magnetic field along the z axis is known as the on-axis magnetic field. The maximum magnetic field values along the z-axis defines the magnitude of $B_w$. The movement along the z direction through an alternating magnetic field causes the electron beam 10 to oscillate in the x direction causing a sinusoidal path 14. The oscillation of the relativistic electrons creates electromagnetic radiation 6 with a frequency which is a function of the electron energy, the oscillation frequency, and the magnetic field strength. The electromagnetic radiation is highly directional in the z direction.

FIG. 2 is a cut away view of a wiggler used in the prior art. An upper magnetic yoke 16 is used to hold a plurality of upper magnetic poles with a first upper magnetic pole 18. A lower magnetic yoke 20 is used to hold a plurality of lower magnetic poles with a first lower magnetic pole 22. The magnetic poles and the magnetic yokes 16, 20 are made of a ferromagnetic material. Adjacent to the first upper magnetic pole are two permanent magnets 24. Adjacent to the first lower magnetic pole are two permanent magnets 26.

The first upper magnetic pole 18 and the adjacent magnets 24 are used as a mandrel for a first upper electromagnetic coil 36. The first lower magnetic pole 22 and the adjacent magnets 26 are used as a mandrel for a first lower electromagnetic coil 38.

The first upper electromagnetic coil 36 and the first lower electromagnetic coil 38 are wound so that as viewed from above looking down in the −y direction the currents in the first upper electromagnetic coil 36 and the first lower electromagnetic coil 38 flow in a clockwise direction. Current in the clockwise direction in the first upper electromagnetic coil 36 creates in the first upper magnetic pole 18 a flux in the downward (−y) direction from the upper magnetic yoke 16 to the tip 28 of the first upper magnetic pole 18. Current in the clockwise direction in the first lower electromagnetic coil 38 creates in the first lower magnetic pole 22 a flux in the downward (−y) direction from the tip 30 of the first lower magnetic pole 22 to the lower magnetic yoke 20. This results in a net effect of a magnetic flux in a downward direction passing across the gap between the first upper magnetic pole 18 and the first lower magnetic pole 22.

The two permanent magnets 24 adjacent to the first upper magnetic pole 18 are oriented to place in the first upper magnetic pole 18 a net magnetic flux into the pole at the location of the first upper adjacent permanent magnets 24. This flux then travels in the general upward (+y) direction in the pole toward the upper magnetic yoke 16. The two permanent magnets 26 adjacent to the first lower magnetic pole 22 are oriented to place in the first lower magnetic pole 22 a net magnetic flux out of the pole at the location of the first lower adjacent permanent magnets 26. This flux travels in the general upward (+y) direction in the pole from the lower magnetic yoke 20. The magnetic flux from the permanent magnets is induced in the poles but does not cross the gap between the first upper magnetic pole 18 and the first lower magnetic pole 22.

A second upper pole has two adjacent permanent magnets 32. The second lower pole has two adjacent permanent magnets 34. The second upper magnetic pole and the adjacent magnets 32 are used as a mandrel for a second upper electromagnetic coil 35. The second lower magnetic pole and the adjacent magnets 34 are used as a mandrel for a second lower electromagnetic coil 37.

The second upper electromagnetic coil 35 and the second lower electromagnetic coil 37 are wound so that as viewed from above looking down in the −y direction the current in the second upper electromagnetic coil 35 and the second lower electromagnetic coil 37 flow in a counterclockwise direction. Current in the counterclockwise direction in the second upper electromagnetic coil 35 and current in the counterclockwise direction in the second lower electromagnetic coil 37 create a flux in the upward (+y) direction. This results in a net effect of a magnetic flux in a upward direction passing across the gap between the second upper magnetic pole and the second lower magnetic pole.

The two permanent magnets 32 adjacent to the second upper magnetic pole are oriented to place in the second upper magnetic pole a magnetic flux in the downward (−y) direction. The two permanent magnets 34 adjacent to the second lower magnetic pole are oriented to place in the second lower magnetic pole a magnetic flux in the downward (−y) direction. The magnetic flux from the permanent magnets is induced in the poles and does not cross the gap between the second upper magnetic pole and the second lower magnetic pole.

Each pole and adjacent set of permanent magnet are used as a mandrel for an electromagnetic coil. The electromagnetic coils are used to induce a magnetic flux in the magnetic poles and thus in the gap between opposite poles giving rise to the alternating magnetic field which causes the electron beam spatial oscillations or "wiggles." Adjusting the current in the electromagnetic coil changes the magnitude of the magnetic field and thus allows the tuning of the wiggler to either 1) compensate for a decrease in electron beam energy along the z direction and thus maintain a resonance condition between the electron beam and the radiation being amplified over a larger spatial distance or 2) change the frequency of the electromagnetic radiation produced by an electron beam of a given energy passing between the tips of the magnetic poles of the wiggler.

Steering coils 40 are wrapped around the upper magnetic yoke 16. The steering coils 40 provide a magnetic field used to make minor steering corrections of the electron beam as it passes through the wiggler.

FIG. 3 is a graph of a hysteresis loop for an iron material. The magnetizing force H applied to the iron material is plotted along the abscissa, and the magnetic induction B induced in the iron is plotted along the ordinate. The slope of the curve forming the loop at a point on the curve is $\mu = \mu_0 \mu_r$, where $\mu_0$ is the free-space permeability. At B=0, for some iron $\mu_r = 1,000$. At point b, $\mu_r$ is close to one. At point b, the iron is magnetically saturated. At point b, an increase in the magnetizing force H, causes only a slight increase in the induced magnetism B in the iron. At points c and d, one side of the hysteresis loop goes from being approximately linear at B=0 to becoming significantly nonlinear. For a wiggler made of this iron, the sum of the magnetic fields in the iron pole induced by the permanent magnets and the electromagnetic coil around a pole is kept between $H_d$ and $H_c$. This is practiced for two reasons. Beyond $H_c$ and $H_d$ the absolute value of $\mu$ decreases, decreasing the change in B for a unit change in H, thus making the change in H less efficient outside of the range. Secondly, the slope $\mu$ becomes variable, making B harder to predict outside of the range. In the claims and specification, applying summed magnetic fields in the pole outside of the range $H_d$ to $H_c$ will be considered a saturating magnetic flux density in the poles.

The design of an iron-core electromagnetic wiggler pole is largely an exercise in simultaneously sufficiently limiting both the maximum magnetic flux density in the iron of the pole structure and the current density in the electromagnetic coils while satisfying system level requirements, minimizing cost and technical risks, etc. A wiggler must often attain the following three systems level goals: (1) high wiggler on-axis magnetic flux density (magnetic field), (2) low magnetic field errors (including those due to saturation of the poles), and (3) widely tunable range. Wiggler design features enabling the attainment of the first goal, e.g. larger electromagnetic coil currents and/or cross-sectional areas, tend to inhibit the attainment of the second due to the onset of magnetic saturation of the wiggler poles. Wiggler pole magnetic saturation also inherently limits the degree to which the first goal can be attained due to the leveling off of the slope beyond the saturation points. K. Halbach in "Some Concepts To Improve The Performance Of DC Electromagnetic Wigglers," Nuclear Instruments and Methods in Physics Research A250 (1986) pp 115-119, North-Holland, Amsterdam describes the design which enables the attainment of much higher magnetic flux densities (while also maintaining a low level of magnetic field errors) in electromagnet wigglers by employing permanent magnets 24, 26, 32, 34 to put a reverse bias magnetic flux in the wiggler pole, without directly altering the wiggler's on-axis magnetic field. This allows the electromagnetic coil current (and thus on-axis magnetic flux density) to be increased to a higher level before the onset of wiggler pole magnetic saturation.

FIG. 4a is a cross section of half a pole shown in FIG. 2 along cut lines 4—4 with a graph of the magnetic flux density along the pole. The magnitude of the on-axis magnetic field $B_w$ is proportional to the magnetic scalar potential at the tip 28 of the pole (U(T)), so that $$B_w = qU(T),  \qquad (1)$$

where q is a constant. U(T) is proportional to the number of ampere-turns in the electromagnetic coil surrounding the coil. The scalar potential anywhere along the pole is given by $$U(y) = U(T)(1-(y-T)/h), \qquad (2)$$

where T is the value of y at the tip of the pole and h is the height of the electromagnet coil 36. The increment in electromagnet coil 36 induced magnetic flux entering (or leaving) the pole per unit vertical distance along the pole ($\delta\Phi_{EM}/\delta y$) is proportional (to first order) to the magnetic scalar potential at that location on the pole (U(y)). Thus from an electromagnetic coil, the induced magnetic flux in the pole which it surrounds is:

$$\begin{aligned}\Phi_{EM}(y) &= \Phi_{EM}(T) + \int_T^y (\delta\Phi_{EM}(y)/\delta y)dy \\ &= \Phi_{EM}(T) + c\int_T^y U(y)dy \\ &= \Phi_{EM}(T) + cU(T)((y-T) - (y-T)^2/2h)\end{aligned}$$

where c is a constant and h is the height of the electromagnetic coils. Since $\Phi_{EM}(T)$ is proportional to U(T), $$\Phi_{EM}(y) = U(T)(k + c((y-T)-(y-T)^2/2h)), \qquad (3)$$

where k is a constant. $\Phi_{EM}(y)$ is maximum at $y = y_{base} = T + h$ and has a value:

$$\begin{aligned}\Phi_{EMmax} &= \Phi_{EM}(T+h) = U(T)(k+c(h/2)) \\ &= cU(T)(k/c + h/2). \qquad (4)\end{aligned}$$

Thus, the magnetic flux density in the pole 18 is a function of both the number of ampere-turns in the electromagnetic coil 36 and the location of those ampere-turns in the electromagnetic coil 36 on the pole 18, while the on-axis magnetic flux density is a function to first order) of the number of ampere-turns only, irrespective of their location in the electromagnetic coil 36 along the pole 18. Equations 1-4 are depicted graphically in FIG. 4. With cU(y) plotted along the abscissa and y along the ordinate, the slope 41 of the shaded region shows how the scalar potential U varies as a function of y according to equation 2. Since $B_w$ is proportional to U(T), the on-axis magnetic flux density is proportional to the width of the base of the shaded region 42, and since $B_{pole}$ is proportional to $\Phi_{pole}$, the electromagnet-induced pole magnetic flux density at any given y is proportional to the area of that portion of the shaded region 42 below that y according to equation 3. In particular, at the base, the maximum electromagnet-induced magnetic flux density is proportional to the area of the entire shaded region, according to equation 4. For simplicity, the proportionality constant between the area of the shaded region 42 and the maximum electromagnet induced pole magnetic flux density is set to 1 in the following examples.

In an example of the requirements for certain iron wigglers the iron reaches its saturation point at ±14 kilo Gauss (kG). To avoid the saturation range, the absolute value of the sum of the magnetic flux density of the electromagnetic coil in the pole (EM) and the magnetic flux density of the permanent magnet in the pole (PM) everywhere within the pole must be less than or equal to 14 kG, denoted by the equation: $-14 \leq (EM+PM) \leq 14$. In this example the permanent magnet induced a magnetic flux density at the base of the pole is −20 kG. Then to avoid saturation, the magnetic flux density at the base of the pole from the electromagnetic coil EM must fall in the range $6 < EM < 34$. This means that the shaded region corresponding to the electromagnetic coil induced magnetic flux density at the pole base must have an area between 6 and 34. FIGS. 4b, c illustrate the range of on-axis magnetic flux densities and the corresponding range of the magnetic flux densities in the pole. In FIG. 4b the saturation limited maximum pole flux density, and thus the pole tip potential corresponding to the saturation-limited maximum on-axis magnetic flux density are shown. The distances over which the ampere-turns are applied is from $T=2$ to $y_{base}=6$ so that $h=4$. Since the area of the shaded region is set equal to the maximum flux density in the pole, the area of the shaded region is 34 kG. Using the equation for the area of a triangle $A=HB/2$ and the equation for the area of a rectangle $A=HB$, where H refers to the height and B refers to the base of the triangle or rectangle. $34=4cU(T)/2+2cU(T)$. Therefore, $cU(T)=8.5$ as denoted along the abscissa. The value $B_w$ is proportional to the scalar potential at the tip (c.f. equation 1), and in this configuration, $B_{w, max}=8.5(q/c)$ is the maximum on-axis magnetic flux density (represented by the width of the base of the shaded region), given the maximum magnetic flux density of 34 (represented by the area of the shaded region) and the geometry of the pole and electromagnet.

In FIG. 4c the saturation limited minimum pole flux density and thus the pole tip potential corresponding to the saturation-limited minimum on-axis magnetic flux density are shown. Since the area of the shaded region is set equal to the minimum flux density in the pole, the area of the shaded region is 6 kG. From the equation for the area of the shaded region $6=4cU(T)/2+2cU(T)$. Therefore, $cU(T)=1.5$, as denoted along the abscissa. In this configuration, $B_{w, min}=1.5(q/c)$ (represented by the width of the base of the shaded region) is the minimum on-axis magnetic flux density value, given the minimum pole electromagnet magnetic flux density of 6 (represented by the area of the shaded region) and the geometry of the pole and electromagnet. By decreasing the height h of the electromagnet coils, $B_{w, max}$ can be increased for a given $B_{pole, max}$ but then $B_{w, min}$ would also be increased. By increasing h, $B_{w, min}$ can be decreased for a given $B_{pole, min}$ but then $B_{w, max}$ would also be decreased. What would be desirable is a means to both increase $B_{w, max}$ and decrease $B_{w, min}$ thus increasing the tunable range of the wiggler.

It should be noted that the slopes 41 of the boundary of the shaded region in FIGS. 4abc are proportional to $\Delta y/\Delta U$. Heat transfer limitations restrict the maximum allowable current density in the electromagnet coils.

The coil current density, $J_{coil}$ is proportional to the rate of change of the magnetic scalar potential along the pole face, $dU/dy$. Therefore the heat transfer constraint limiting the magnitude of $J_{coil}$ effectively puts a lower bound on the slope 41 of the boundary of the shaded region. A vertical boundary (infinite slope) implies a zero current in the coil (as in FIG. 10 for example), while a physically impossible horizontal boundary would imply an infinite current in the coil. The important point is that there are two design constraints: a magnetic saturation constraint and a heat transfer constraint. In FIG. 4b, then, maximum $B_w$ is attained by increasing coil current until either (1) the pole saturates (i.e. the area of the shaded region 42 is 34) or (2) the slope 41 reaches its heat transfer limited maximum allowable value, whichever comes first. We have assumed this example is saturation limited.

The base of the pole is the location where the electromagnets induce the greatest flux density in the pole. When the permanent magnets are used to apply a reverse bias flux in the pole, then the permanent magnet may induce an incremental flux in the pole at a specific location that exceeds the incremental flux induced by the electromagnet at that location and it is possible that pole saturation may first occur at a location other than the pole base. Thus, in general, one must insure that $-14 \leq EM+PM \leq 14$ for all pole locations "y". The illustrative example of FIG. 4 assumed the pole first saturated at the base, however the general principles for determining the tuning range, outlined above, are not restricted to this special case.

FIG. 5 illustrates the change in the tunable range caused by adding the adjacent permanent magnets to the poles. The dashed line 141 indicates the range over which electromagnetic coils alone may induce flux into the pole without incurring saturation. The solid line 142 indicates the range over which electromagnetic coils may induce flux into a pole surrounded by adjacent reverse-biasing permanent magnets. The adjacent permanent magnets shift the range but the width of the range due to the electromagnets for a pole surrounded by adjacent permanent magnets 44 remains approximately equal to the width of the range due to the electromagnets alone 43.

FIG. 6 illustrates another type of wiggler assembly used in the prior art as described by K. Halbach in "Some Concepts To Improve The Performance of DC Electromagnetic Wigglers" cited above. The apparatus shown here uses sheets of permanent magnets (laced magnets) 45 between the electromagnetic coil windings 46 in addition to the permanent magnets 48 adjacent to the poles 47 to further increase the attainable on-axis magnetic flux density beyond that attainable with the use of only adjacent permanent magnets. Since the electromagnetic flux density in the pole is correspondingly increased for the same amount of current in the electromagnet due to its vertical displacement on the pole so as to accommodate the laced permanent magnet, the minimum attainable on-axis magnetic flux density $B_{w, min}$ increases more than does the maximum on-axis magnetic flux density $B_{w, max}$ and thus the tunable range decreases. In the prior art the plurality of electromagnetic coils surrounding a pole were electrically connected so that the current through each coil along a pole is not independently controlled. It would be desirable to increase the tunable range of this apparatus.

SUMMARY OF THE INVENTION

It is an object of the invention to provide a wiggler with a high on-axis magnetic flux density, low magnetic field errors, and a widely tunable range.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Tunability enhancement, introduced herein, is a design feature enabling attainment to a much larger extent than heretofore possible of the three goals of high wiggler on-axis magnetic flux density, low magnetic field errors, and wide tunable range simultaneously. Alternatively, tunability enhancement allows attainment of much larger tuning ranges in accurate, high magnetic flux density electromagnetic wigglers than have been heretofore possible.

The invention comprises the use of a plurality of spatially separated electromagnetic coils surrounding a single pole, wherein the currents in the individual coils are independently controllable to provide large tuning ranges while preventing magnetic flux density saturation of the poles.

The inventive apparatus and method increases the tunable range of a wiggler whereby the current density of the electromagnetic coil as a function of coil location along the pole is varied spatially to exploit the differences in the functional dependencies of on-axis magnetic flux density, $B_w$ and pole magnetic flux density, $B_{pole}$ on the magnitude and pole location of applied ampere-turns. To increase the maximum attainable on-axis magnetic flux density most of the ampere-turns are put as close to the pole tip as possible so as to minimize the pole magnetic flux density and thus keep the pole from magnetically saturating in the forward direction until a higher on-axis magnetic flux density is reached. Similarly, to decrease the minimum attainable on-axis magnetic flux density most of the ampere-turns are put as far from the pole tip as possible so as to maximize the pole flux density and thus keep the pole from magnetically saturating in the reverse direction until a lower on-axis magnetic flux density is reached.

Another important feature of the inventive apparatus and method is that it is very flexible in that it can accommodate large changes in design points with very little performance loss, where such changes would render a conventional wiggler totally useless.

DETAILED DESCRIPTION OF THE EMBODIMENTS

Figure 1:
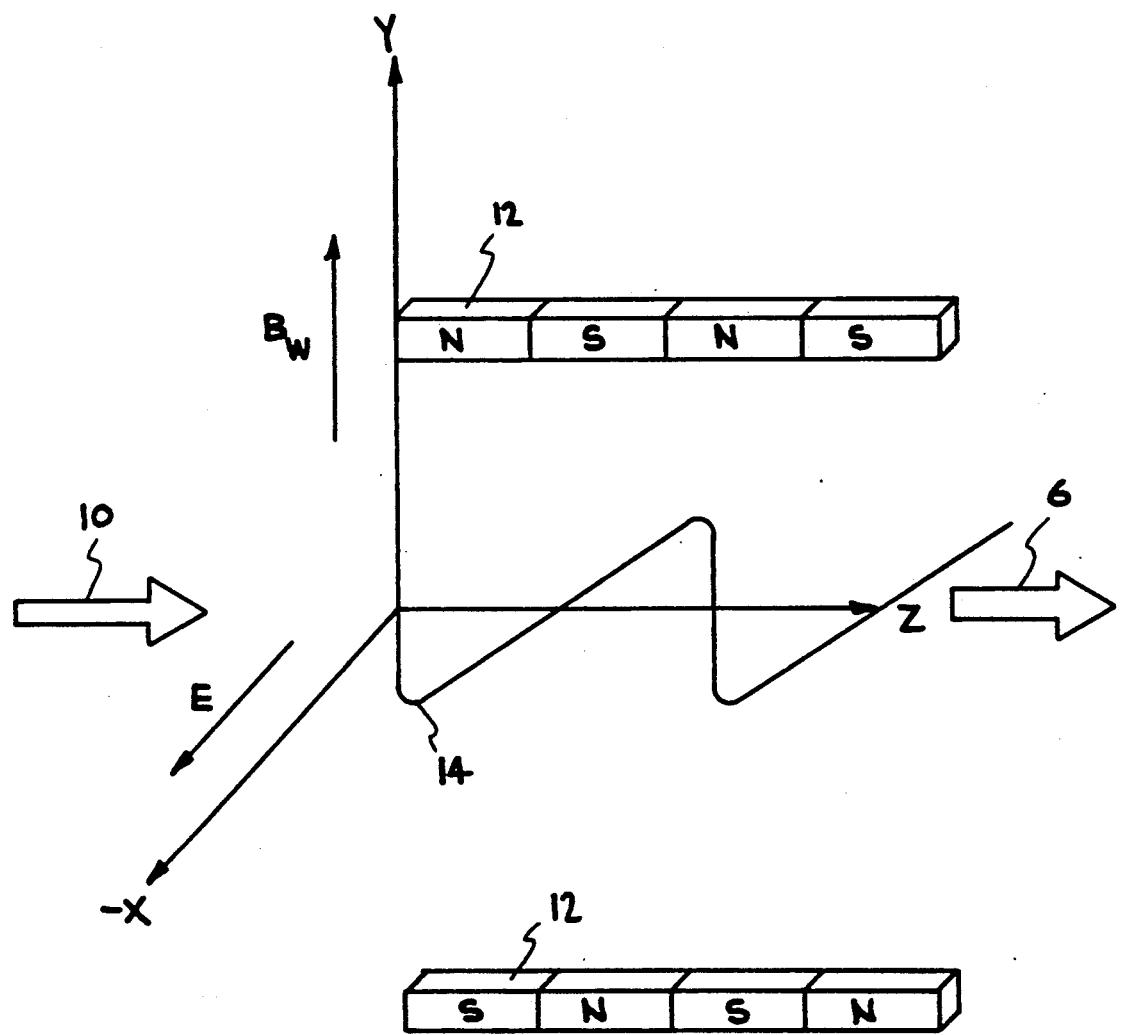
FIG. 1 is a schematic illustration of a electron beam wiggler.
Figure 2:
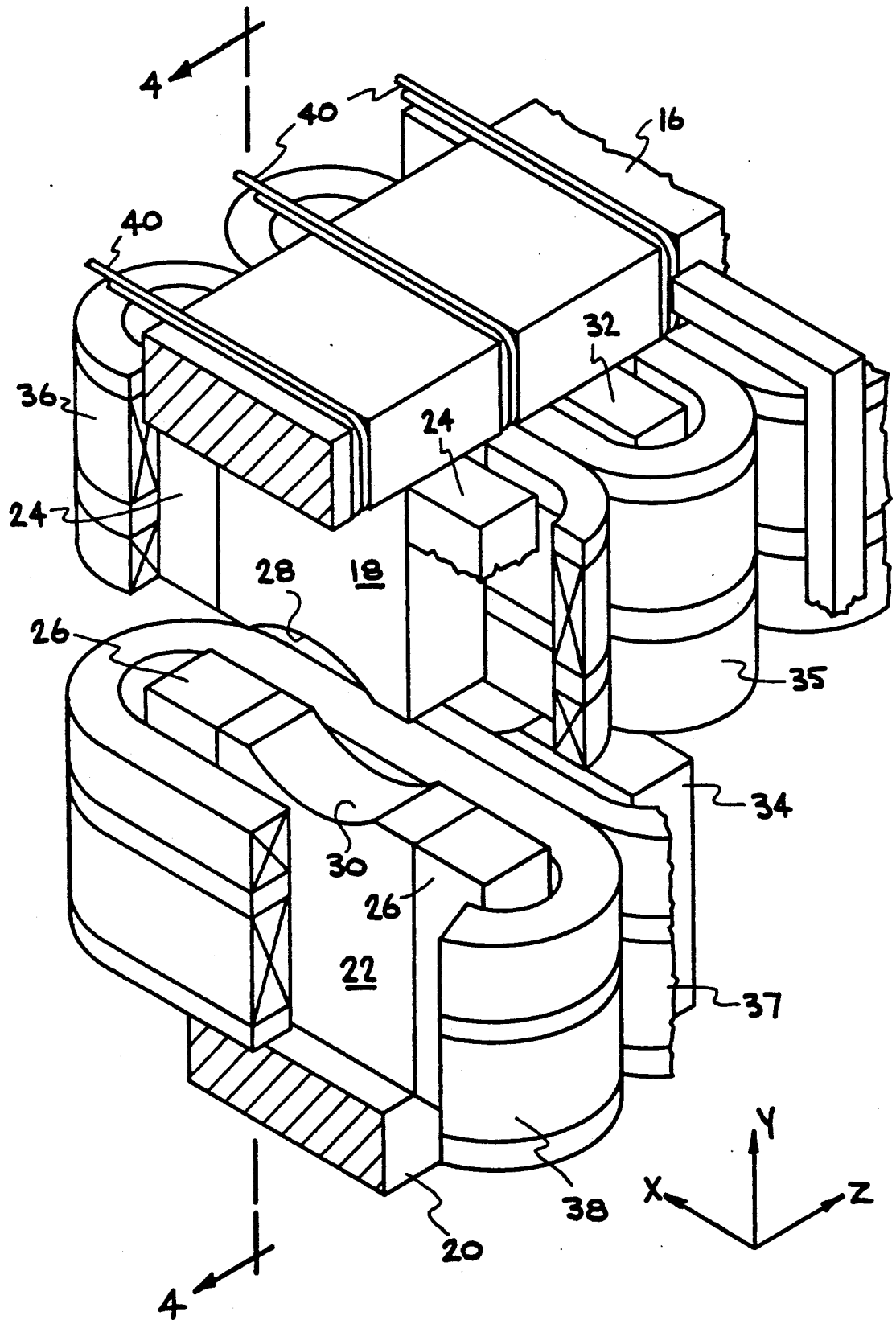
FIG. 2 is a cut away perspective view of part of an electron beam wiggler used in the prior art.
Figure 3:
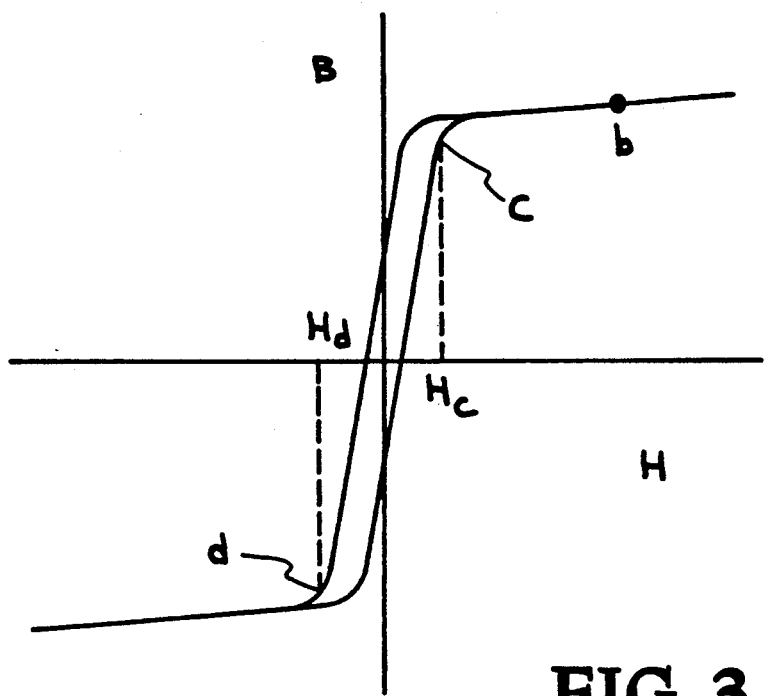
FIG. 3 is a graph of a hysteresis loop for an iron material.
Figure 5:
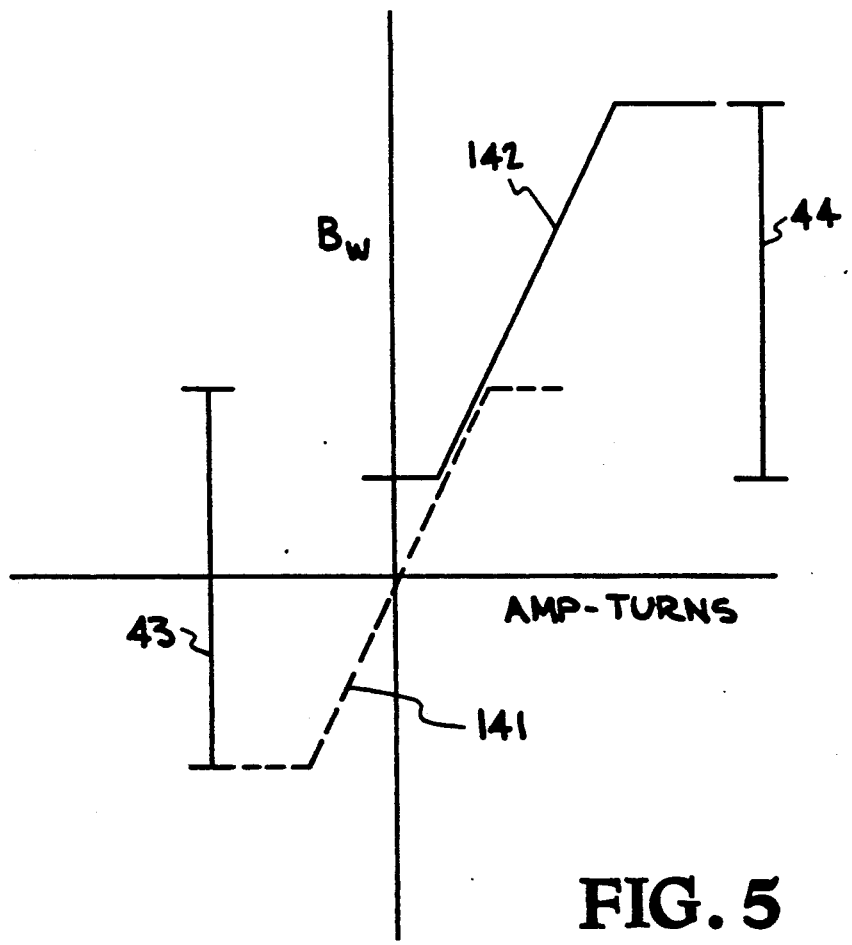
FIG. 5 is a graph between the number of ampere-turns in the electromagnetic coil and the on-axis magnetic flux density.
Figure 4A:
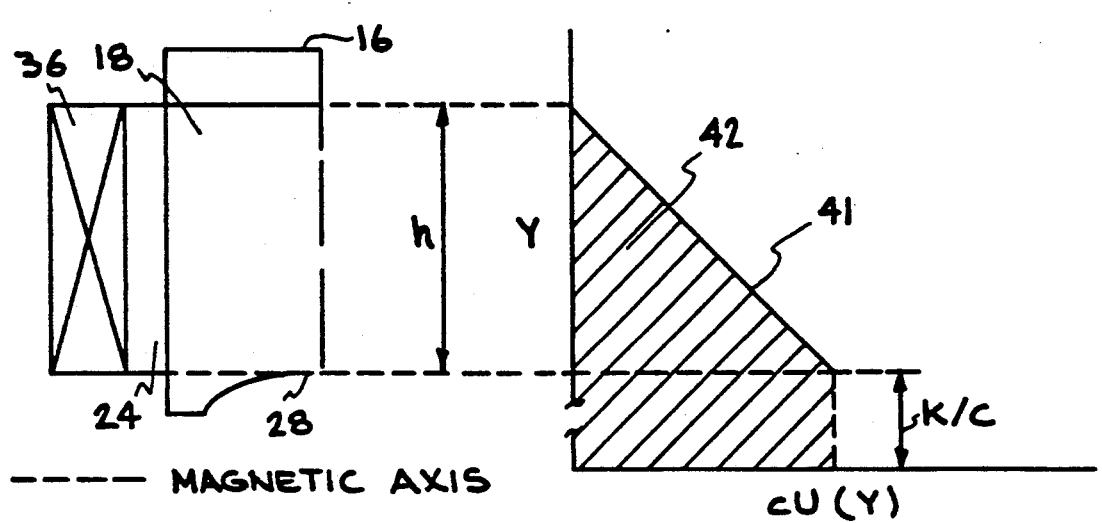
FIGS. 4abc illustrate half of a pole for a wiggler used in the prior art and a graph of the magnetic flux density in the pole and the on-axis magnetic flux density.
Figure 4B:
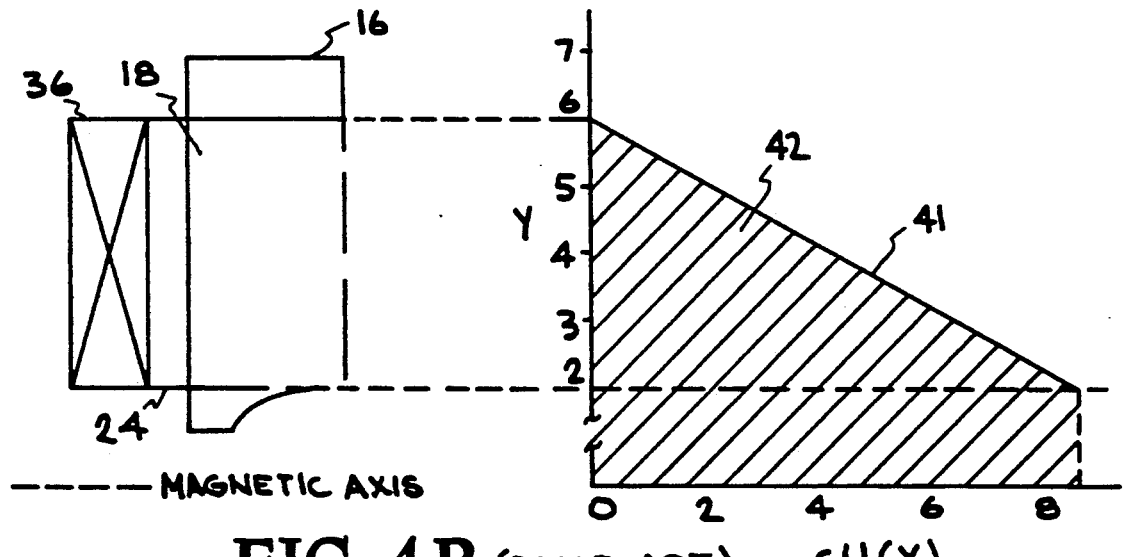
Figure 4C:
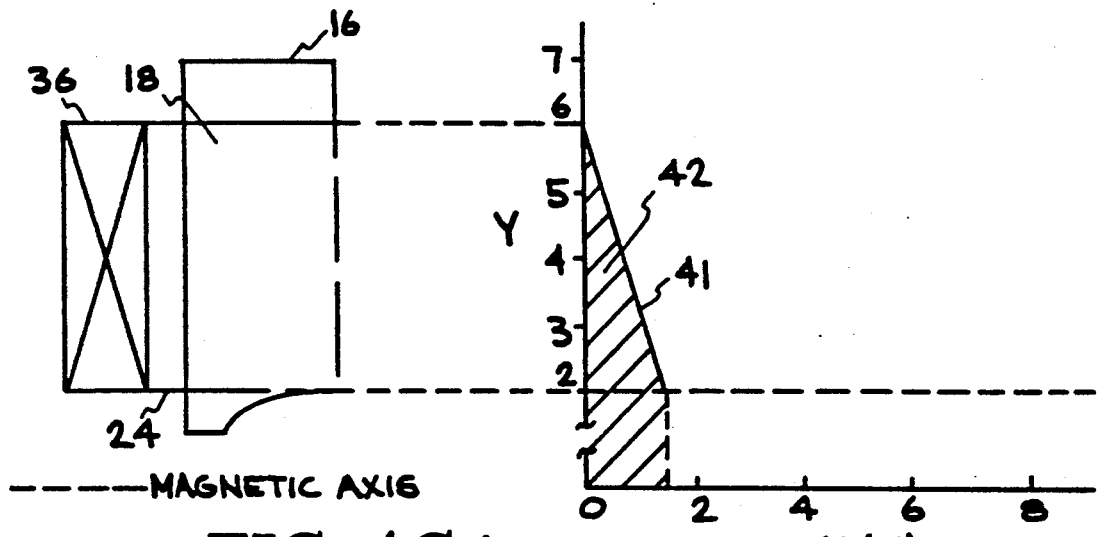
Figure 6:
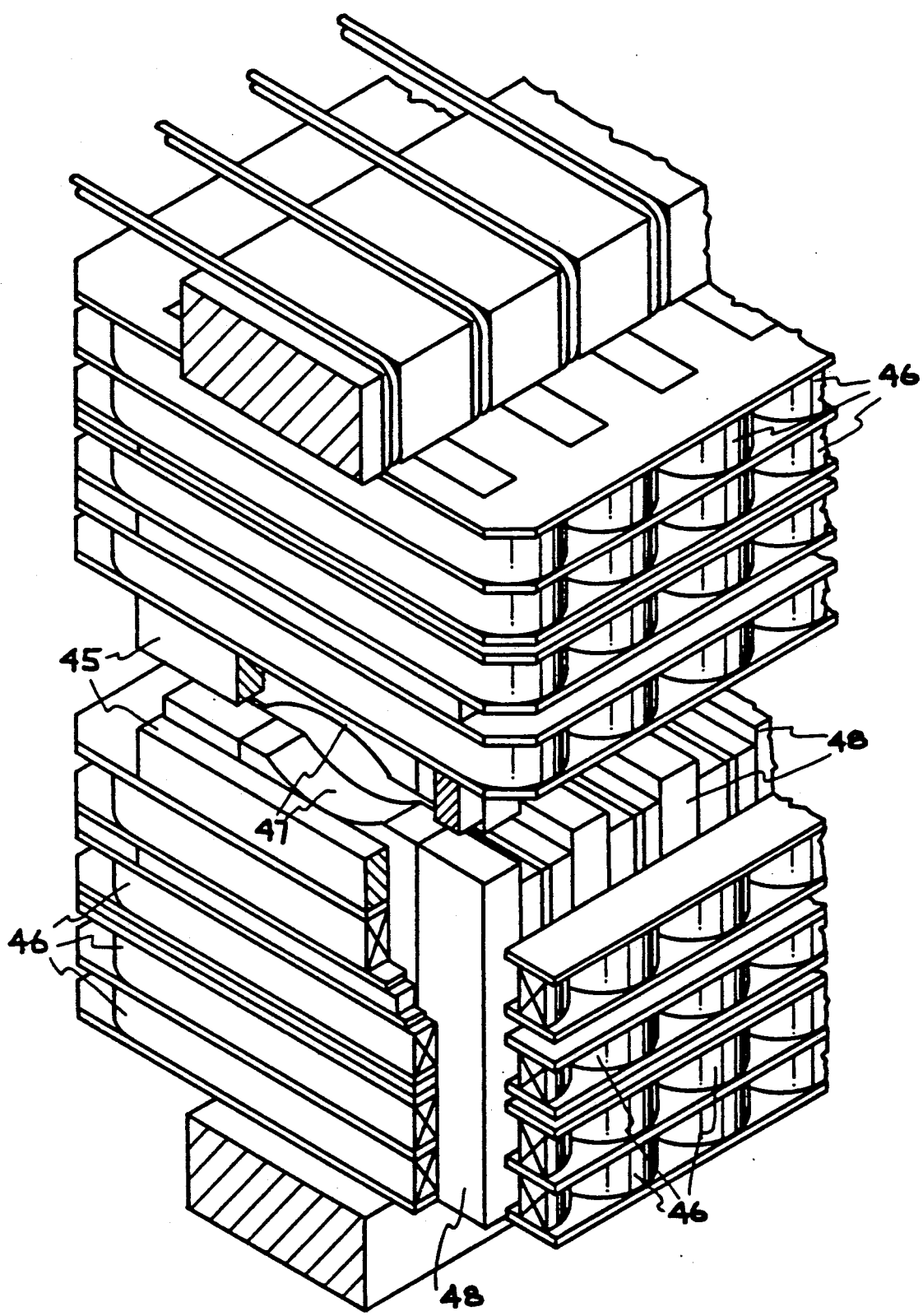
FIG. 6 illustrates a wiggler used in the prior art which utilizes laced permanent magnets.
Figure 7:
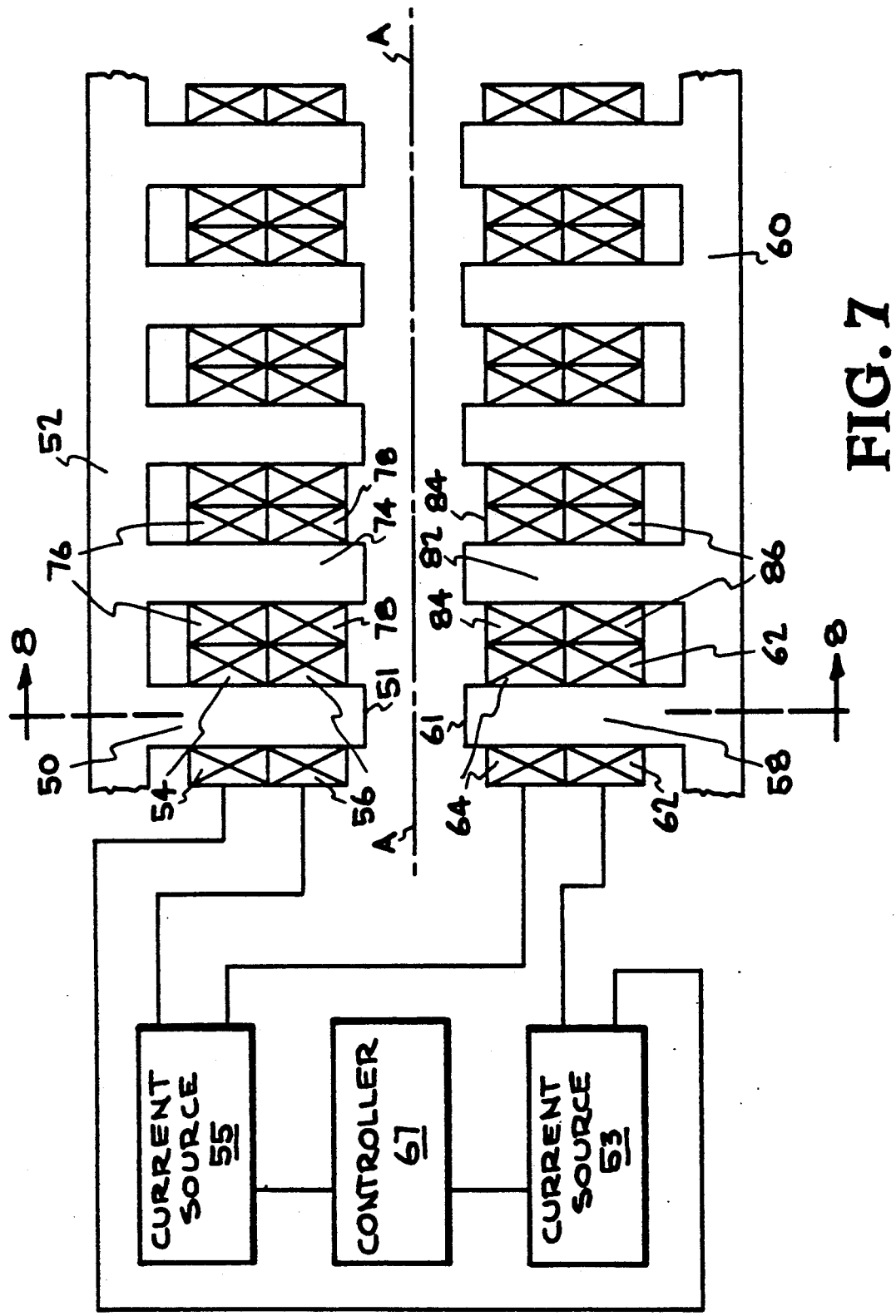
FIG. 7 illustrates a cross-sectional view of a wiggler poles using an embodiment of the inventive electromagnetic coil configuration.
Figure 8:
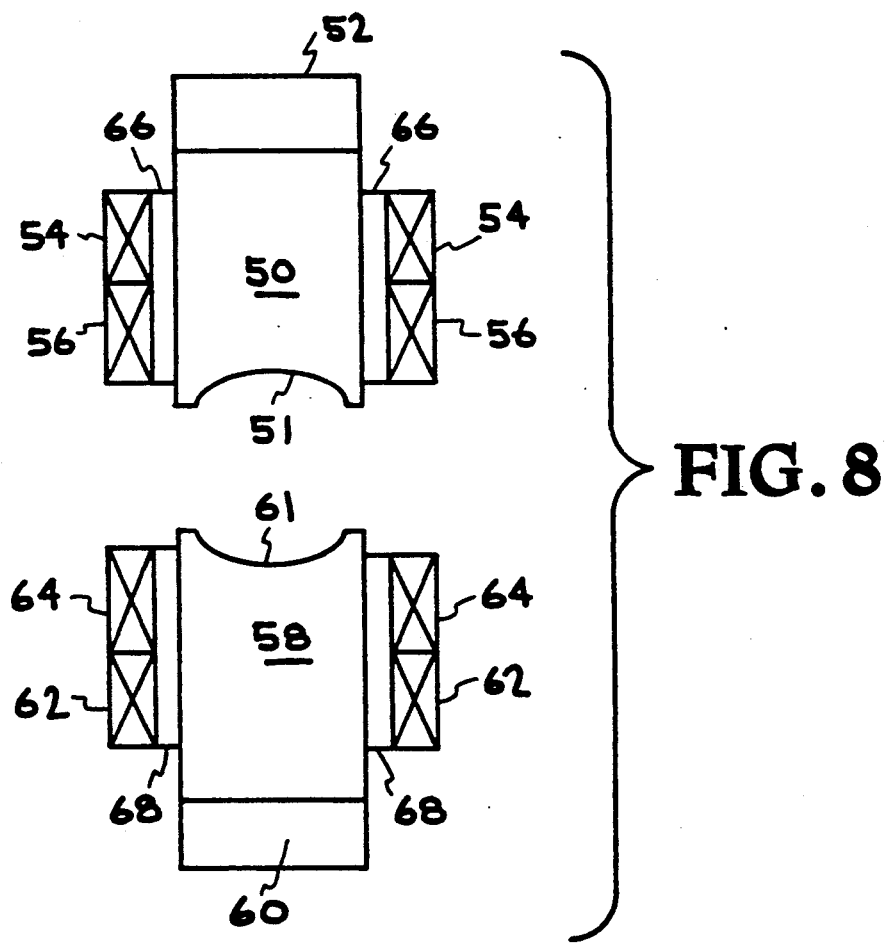
FIG. 8 is a cross-sectional view of the wiggler illustrated in FIG. 7 along cut lines 8—8.

FIG. 7 illustrates a cross-sectional view of a wiggler using an embodiment of the invention. A first upper pole 50 is supported by an upper magnetic yoke 52 and has a tip 51 which is at the end of the first upper pole 50 that is furthest from the upper magnetic yoke 52. The first upper pole 50 is surrounded by a first electromagnetic coil 54 and a second electromagnetic coil 56. The number of turns in the first electromagnetic coil 54 is of the same order of magnitude as the number of turns in the second electromagnetic coil 56 meaning that the number of turns in the first electromagnetic coil 54 is greater than half of the number of turns in the second electromagnetic coil 56, and that the number of turns in the second electromagnetic coil 56 is greater than at least half of the number of turns in the first electromagnetic coil 54. The first electromagnetic coil 54 is closer to the upper magnetic yoke 52 than the second electromagnetic coil 56, and the second electromagnetic coil 56 is closer to the tip 51 than the first electromagnetic coil 54. The first electromagnetic coil 54 is electrically connected to a first electromagnetic coil current source 53. The second electromagnetic coil 56 is electrically connected to a second electromagnetic coil current source 55. These current sources 53, 55 allow the first and second electromagnetic coils 54, 56 to be powered independently of each other. Across the electron beam axis A—A from the first upper pole 50 is a first lower pole 58 supported by a lower magnetic yoke 60. The first lower pole 58 has a tip 61 which is at the end of the first lower pole 58 that is furthest from the lower magnetic yoke 60. The first lower pole 58 is surrounded by a first electromagnetic coil 62 and a second electromagnetic coil 64. The first electromagnetic coil 62 is closer to the lower magnetic yoke 60 than the second electromagnetic coil 64, and the second electromagnetic coil 64 is closer to the tip 61 than the first electromagnetic coil 62. The first electromagnetic coil 62 is electrically connected to the first electromagnetic coil current source 53. The second electromagnetic coil 64 is electrically connected to the second electromagnetic coil current source 55. These current sources 53, 55 allow the first and second electromagnetic coils 62, 64 to be powered independently of each other. A master controller 67 is used to control the current sources 53, 55. FIG. 8 is a cross-sectional view of the wiggler shown in FIG. 7 along cut lines 8—8. Adjacent to the first upper pole 50 is a pair of permanent magnets 66. Adjacent to the first lower pole 58 is a pair of permanent magnets 68. Next to the first upper pole 50 is a second upper pole 74, which is supported by the upper magnetic yoke 52. The second upper pole 74 is surrounded by a first electromagnetic coil 76 and a second electromagnetic coil 78. Adjacent to the second upper pole 74 is a pair of permanent magnets, not shown. Across the magnetic axis A—A from the second upper pole 74 and next to the first lower pole 58 is a second lower pole 82, which is supported by the lower magnetic yoke 60. The second lower pole 82 is surrounded by a first electromagnetic coil 86 and a second electromagnetic coil 84. Adjacent to the second lower pole 82 is a pair of permanent magnets, not shown.

Figure 9:
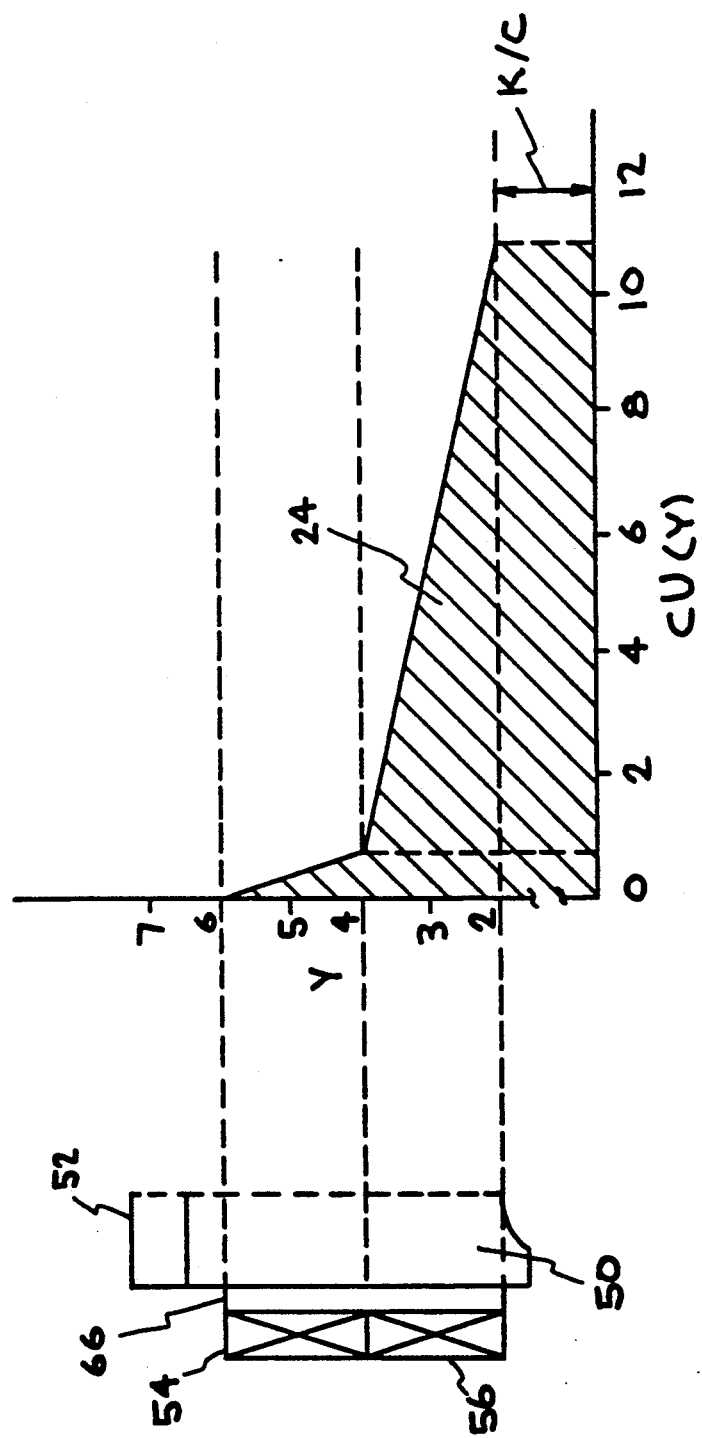
FIG. 9 illustrates a half pole shown in FIG. 8 and a graph of the magnetic flux density in the pole and the on-axis magnetic flux density, using two coils producing magnetic fields in the pole in the same general direction.
Figure 10:
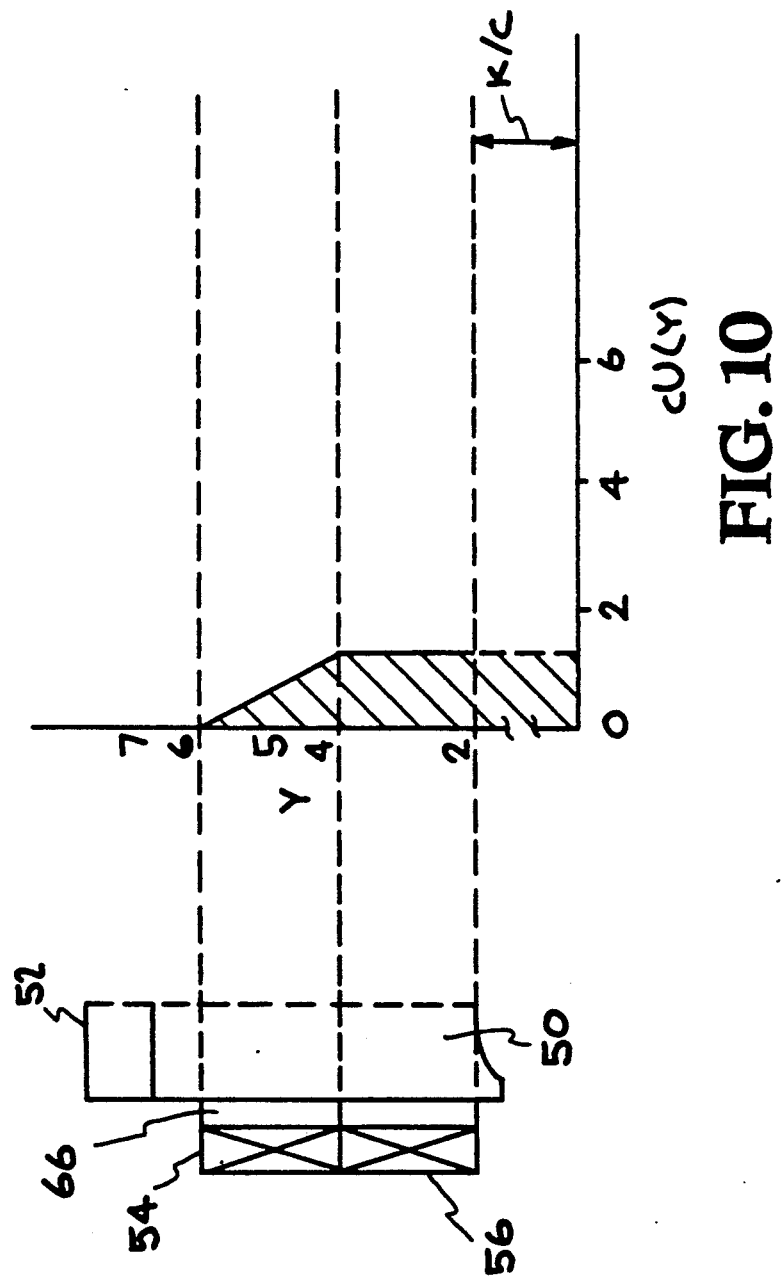
FIG. 10 illustrates a half pole shown in FIG. 8 and a graph of the magnetic flux density in the pole and the on-axis magnetic flux density.

FIGS. 9 and 10 illustrate how the inventive wiggler is useful in increasing the tunable range of a wiggler. FIG. 9 is a half pole shown in FIG. 8 with a graph of the magnetic scalar potential U along the pole 50. The attainable on-axis magnetic flux density can be inferred from the value of the scalar potential at the pole tip U(T) using Equation 1. The pole magnetic flux density due to the electromagnetic coils at any location "y" can be inferred from the area of the shaded region below that "y" value using Equation 3. Using the parameters given in the example of the prior art, for certain iron wigglers the iron reaches its saturation point at ±14 kG. To avoid the saturation range, the absolute value of the sum of the pole magnetic flux density due to the electromagnetic coils and the pole magnetic flux density due to the permanent magnet must be less than or equal to 14 kG along the entire pole length, ie: $-14 \leq (EM+PM) \leq 14$. As in the previous example the magnetic flux density of the permanent magnets is $-20$ kG. To avoid saturation the pole magnetic flux density due to the electromagnetic coil EM must fall in the range $6 \leq EM \leq 34$. This means that the shaded area 24 must have an area between 6 and 34. FIG. 9 illustrates an approximate $B_{w, max}$ obtainable if the first and second electromagnetic coils 54, 56 surrounding the pole are independently controllable. In this example, the current in the second electromagnetic coil 56 is first increased from zero until it reaches its maximum heat transfer limited value or until the magnetic field in the pole reaches a point just before the pole starts to saturate whichever occurs first. In FIG. 9 we assume the heat transfer limited value of current in the second electromagnetic coil 56 is reached. Then the current in the first electromagnetic coil 54 is increased from zero until the magnetic field produced by the current reaches a point just before the pole starts to saturate. In this example, which is the same as the example in the prior art except that two independently controlled electromagnetic coils are used in place of the single electromagnetic coil used in the prior art, for a shaded region of 34 kG an obtainable magnetic flux density $B_w = 10.8(q/c)$ kG, as shown in FIG. 9. This provides a magnetic flux density increase of 27% over the maximum obtainable magnetic flux density increase in the prior art.

FIG. 10 is a half pole shown in FIG. 8 and a graph of the magnetic scalar potential U along the pole. FIG. 10 illustrates the minimum on-axis flux density attainable by the embodiment of the invention illustrated in FIGS. 7 and 8 using two electromagnetic coils and where current sources 55 and 53 independently provide current to the coils. Starting with both coil currents at zero, the current in the first coil 54 is increased until the pole becomes unsaturated (i.e. the area of the shaded region becomes 6) or until it reaches its maximum heat transfer-limited value, which ever occurs first. If the pole is first unsaturated, then the current in the second electromagnetic coil is left at zero as shown in FIG. 10. If the first coil 54 has reached its maximum heat transfer limited value, the current in the second electromagnetic coil 56 is increased until the pole becomes unsaturated. In this example as shown in FIG. 10 the minimum attainable on-axis magnetic flux density $B_w = 1.2(q/c)$ kG representing a 20% reduction in the minimum on-axis magnetic flux density in the prior art with the same parameters.

Therefore in this embodiment of the invention using two independently controllable coil currents the on-axis magnetic field can be increased by approximately 27% and decreased by approximately 20% over the prior art. This allows the wiggler to have a 37% wider tunable range, without causing the poles to experience magnetic saturation, thus reducing magnetic field errors.

Figure 11:
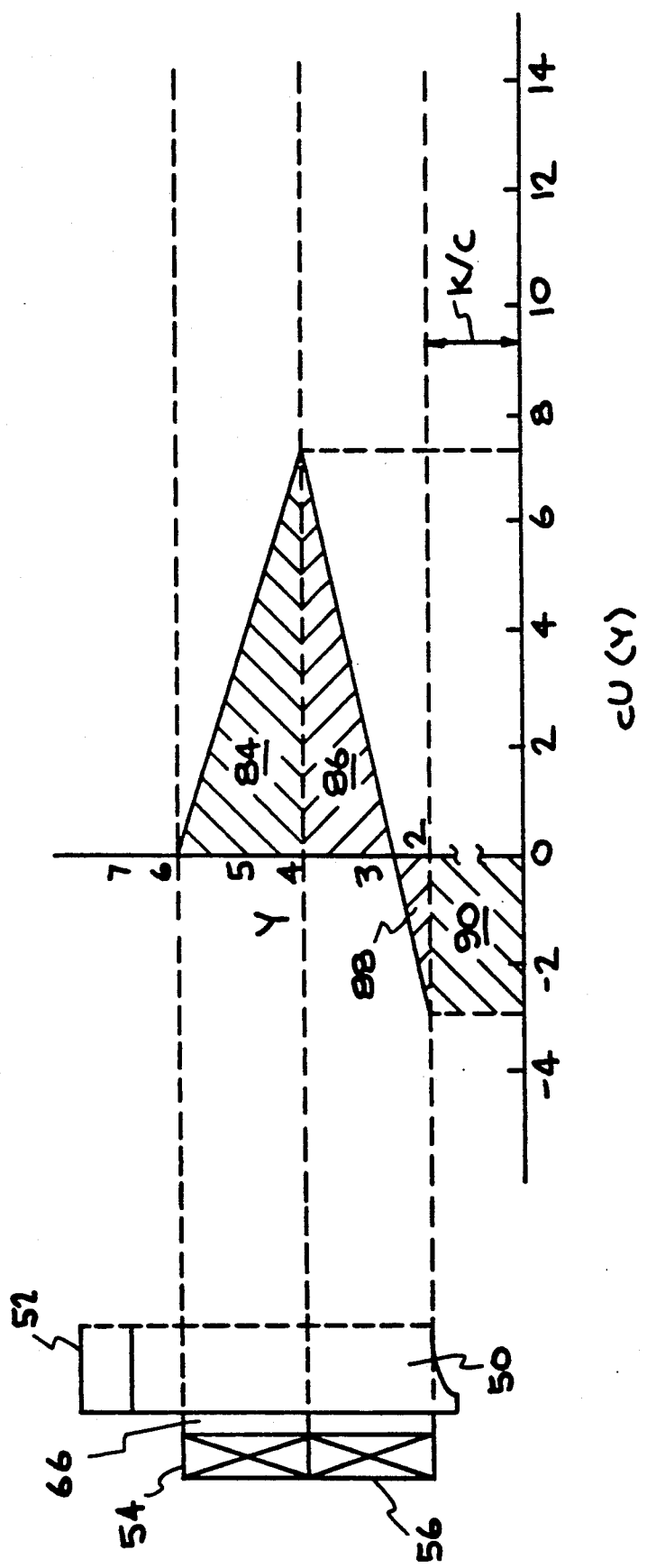
FIG. 11 illustrates a half pole shown in FIG. 8 and a graph of the magnetic flux density in the pole and the on-axis magnetic flux density, using electromagnetic coils producing magnetic fields in the pole in opposite directions.

FIG. 11 illustrates an on-axis magnetic flux density which is attainable if the electromagnets have a polarity that is reversible. FIG. 11 illustrates a half pole shown in FIG. 8, with a graph of the magnetic scalar potential U along the pole 50. In this example the net shaded area will be equal to 6, corresponding to the minimum allowable electromagnetic coil induced flux density of the pole which is 6 kG. The first electromagnetic coil 54 generates a magnetic flux density so that its contribution to the magnetic flux density on-axis is $7.2(q/c)$ kG The area of the shaded region 84 from y=4 to y=6 forming a triangle is 7.2. The second electromagnetic coil 56 generates a magnetic flux density so that its contribution to the magnetic flux density on-axis is $-10.0$. This forms two triangular shaded areas over the distance between y=2 to y=4. The first triangular shaded area 86 has an area of $(\frac{1}{2})(7.2)(1.44) = 5.184$. The second triangular shaded area 88 has an area equal to $(\frac{1}{2})(-2.8)(2-1.44) = -0.784$. This also yields a shaded rectangular area 90 equal to $(-2.8)(2) = -5.6$. The total area is $7.2 + 5.184 - 0.784 - 5.6 = 6$. In this configuration, the electromagnetic coil induced magnetic flux density in the pole is not less than 6 kG, preventing saturation, and yet an on-axis magnetic flux density of $-2.8$ is obtained. This represents a 94% increase in the tunable range over that of the prior art.

In review, FIG. 9 illustrates how for a given pole-coil-permanent magnet geometry the invention increases the maximum attainable on-axis magnetic flux density by putting as much current as possible as close to the tip of the pole as possible. FIGS. 10 and 11 illustrate how for a given pole-coil-permanent magnet geometry the invention decreases the minimum attainable on-axis magnetic flux density by putting as much current as possible as far from the tip of the pole as possible. The combined effect is to greatly expand the tunable range of the wiggler.

Therefore the inventive wiggler in this embodiment has a tunable range from $-2.8(q/c)$ kG to $10.8(q/c)$ kG, with a width of $13.6(q/c)$kG. The prior art under the same parameters may have a tunable range from $1.5(q/c)$ kG to $8.5(q/c)$ kG, with a width of $7(q/c)$ kG. Therefore in this embodiment the invention provides a tunable range with a width that almost doubles the width of the tunability range of the prior art without introducing additional field errors. The increase in tuning range attained by the use of the invention is more dramatic for higher field wigglers employing laced permanent magnets.

As long as the electromagnetic coils are adjusted to keep the magnetic flux density at all locations in the pole within the unsaturated range, the main limitation on the range of the magnetic flux density is the heat transfer constraint. An increase in current in the electromagnetic coils increases the amount of heat produced. The ability of the wiggler to remove the produced heat limits the current in the electromagnetic coils, thus limiting the magnetic field produced by the electromagnetic coils.

Although the invention may be used with more than two independent electromagnetic coils around each pole, two independent electromagnetic coils provides the tunability range desired in current applications of the invention.

Figure 12:
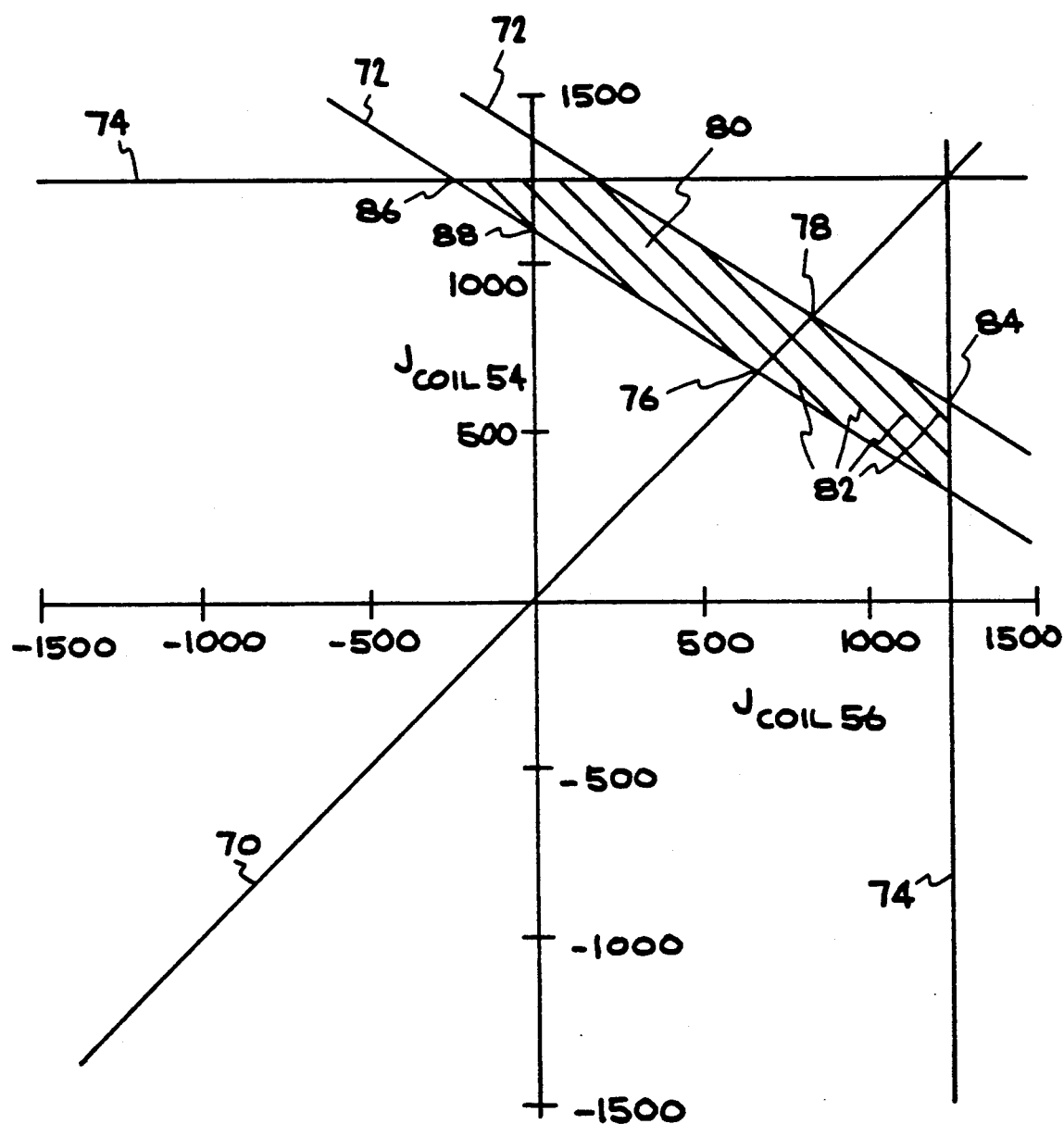
FIG. 12 is a graph of the current density in the first electromagnetic coil versus the current density in the second electromagnetic coil.

FIG. 12 is a graph of the linear operating regime with the current density in the first electromagnetic coil 54 plotted along the ordinate and the current density in the second electromagnetic coil 56 plotted along the abscissa. In the prior art, the current density in the first electromagnetic coil 54 was always approximately equal to the current density in the second electromagnetic coil 56 since the prior art used either a single electromagnet around each pole or a plurality of electromagnetic coils which were not independently controlled. Therefore the range achieved by the prior art was along a diagonal line 70. Also shown are lines illustrating the magnetic saturation constraint 72 and lines illustrating the heat transfer constraint 74. Given these constraints, the prior art may only operate along line 70 between points 76 and 78. The invention allows the flexibility to operate anywhere within the shaded region 80. The lines 82 shading the region 80 are lines of constant on-axis magnetic flux density, $B_w$. Thus for the invention, the on-axis magnetic flux density $B_w$ is maximized at operating point 84 and minimized at operating point 86 (or operating point 88 if the coils do not have reverse polarity capability). The prior art yields a tunable range between 76 and 78, with the inventive improved tunable range being between 84 and 86 (or 88).

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A wiggler, comprising:
   an upper magnetic yoke which has a length along a first direction;
   a lower magnetic yoke with a length along the first direction wherein the lower magnetic yoke is spaced apart from the upper magnetic yoke;
   a plurality of upper pole assemblies attached to the upper magnetic yoke and aligned linearly along the first direction, wherein each upper pole assembly comprises:
   a pole attached to the upper magnetic yoke;
   a first electromagnetic coil surrounding the pole;
   a second electromagnetic coil surrounding the pole;
   a means for controlling the current in the first electromagnetic coil; and
   a means for controlling the current in the second electromagnetic coil, wherein the current in the first electromagnetic coil and the second electromagnetic coil is set independently from each other; and
   a plurality of lower pole assemblies attached to the lower magnetic yoke and aligned linearly along the first direction, wherein each lower pole assembly comprises:
   a pole attached to the lower magnetic yoke;
   a first electromagnetic coil surrounding the pole;
   a second electromagnetic coil surrounding the pole;
   a means for controlling the current in the first electromagnetic coil; and
   a means for controlling the current in the second electromagnetic coil, wherein the current in the first electromagnetic coil and the second electromagnetic coil is set independently from each other.

2. A wiggler as claimed in claim 1, wherein in each upper pole assembly each pole has a tip which is the furthest part of the pole from the upper magnetic yoke and wherein each first electromagnetic coil surrounding a pole is located closer to the upper magnetic yoke and further from the tip of the pole than the second electromagnetic coil surrounding the pole, and wherein in each lower pole assembly each pole has a tip which is the furthest part of the pole from the lower magnetic yoke and wherein each first electromagnetic coil surrounding a pole is located closer to the lower magnetic yoke and further from the tip of the pole than the second electromagnetic coil surrounding the pole.

3. A pole assembly as claimed in claim 2, wherein the number of turns in each first electromagnetic coil is of the same order of magnitude as the number of winds in each second electromagnetic coil.

4. A pole assembly in a wiggler, comprising;
   a pole with a height and a tip, wherein the tip of the pole is at the top of the height of the pole and wherein an axis is defined above the tip of the pole;
   a first electromagnetic coil;
   a second electromagnetic coil;
   a first means for controlling current in the first electromagnetic coil; and
   a second means for controlling the current in the second electromagnetic coil, wherein the current in the first electromagnetic coil and the second electromagnetic coil is set independently from each other.

5. A pole assembly as claimed in claim 4, wherein the second electromagnetic coil is at a higher height and nearer to the tip of the pole than the first electromagnetic coil.

6. A pole assembly as claimed in claim 5, wherein number of winds in the first electromagnetic coil is of the same order of magnitude as number of winds in the second electromagnetic coil.

7. A pole assembly as claimed in claim 6, further comprising a master means for controlling the first means for controlling and the second means for controlling.

8. A pole assembly as claimed in claim 7, wherein the master means further comprises a means for inducing a current in the first electromagnetic coil and thus an on-axis magnetic flux density from the first electromagnetic coil and a means for inducing a higher current in the second electromagnetic coil and thus a higher on-axis magnetic flux density from the second electromagnetic coil to obtain a high on-axis magnetic flux density without magnetically saturating the pole.

9. A pole assembly as claimed in claim 8, wherein the master means further comprises a means for inducing a current in the first electromagnetic coil and inducing a low or no current in the second electromagnetic coil to obtain a low on-axis magnetic flux density without magnetic saturation of the pole.

10. A pole assembly as claimed in claim 9, wherein the master means further comprises a means for inducing a current in the first electromagnetic coil providing a magnetic field, and inducing a reverse current in the second electromagnetic coil so that the magnetic field of the second electromagnetic coil is in the general opposite direction to the magnetic field produced by the first electromagnetic coil to obtain a low or negative on-axis magnetic flux density without magnetic saturation of the pole.

11. A method of tuning a pole assembly in an electromagnetic wiggler to obtain a wide tunable range of an on-axis magnetic flux density, comprising the steps of:
   inducing a current in a first electromagnetic coil surrounding a pole in a pole assembly, wherein the pole has a tip near the top of the height of the pole and where the first electromagnetic coil is displaced down the height of the pole from the tip, and inducing a lower or no current in a second electromagnetic coil, wherein the second electromagnetic coil is closer to the tip of the pole being higher in height than the first electromagnetic coil to obtain a low on-axis magnetic flux density without magnetic saturation of the pole; and
   inducing a current in the second electromagnetic coil surrounding the pole and inducing a lower or no current in the first electromagnetic coil to obtain a high on-axis magnetic flux density without magnetic saturation of the pole.

12. A method as claimed in claim 11, wherein the number of turns in the first electromagnetic coil is of the same order of magnitude as the number of winds in the second electromagnetic coil.

13. A method as claimed in claim 12, further comprising the step of inducing a current in the first electromagnetic coil providing a magnetic field, and inducing a reverse current in the second electromagnetic coil so that the magnetic field of the second electromagnetic coil is in a general opposite direction to the magnetic field produced by the first electromagnetic coil to obtain a very low or negative on-axis magnetic flux density without magnetic saturation of the pole.

14. A method as claimed in claim 13, wherein the step of inducing a current in the first electromagnetic coil providing a magnetic field, and inducing a reverse current in the second electromagnetic coil so that the magnetic field of the second electromagnetic coil is in the general opposite direction to the magnetic field produced by the first electromagnetic coil, comprises the steps of:
   setting the current in both the first electromagnetic coil and the second electromagnetic coil to approximately zero;
   increasing the current in the first electromagnetic coil until it reaches its heat transfer limited value;
   inducing a reverse current in the second electromagnetic coil and increasing the density of the current until the second electromagnetic coil reaches its maximum heat transfer limited value; and
   decreasing the current in the first electromagnetic coil until a point just before the pole starts to saturate.

15. A method as claimed in claim 12, wherein in the step of inducing a current in the first electromagnetic coil and a lower or no current in the second electromagnetic coil the intensity of the on-axis magnetic field produced by the first electromagnetic coil is at least a factor of two greater than the intensity of the on-axis magnetic field produced by the second electromagnetic coil and wherein in the step of inducing a current in the second electromagnetic coil and a lower or no current in the first electromagnetic coil the intensity of the on-axis magnetic field produced by the second electromagnetic coil is at least a factor of two greater than the intensity of the on-axis magnetic field produced by the first electromagnetic coil.

16. A method as claimed in claim 11, wherein the step of inducing a current in the second electromagnetic coil and a lower or no current in the first electromagnetic coil, comprises the steps of:
   setting the current in both the first electromagnetic coil and the second electromagnetic coil to approximately zero;
   increasing the current in the second electromagnetic coil until the pole becomes unsaturated;
   further increasing the current in the second electromagnetic coil either until the heat transfer limited current of the second electromagnetic coil is reached or until the magnetic field produced by the current reaches a point just before the pole starts to saturate; and
   increasing the current in the first electromagnetic coil until the magnetic field produced by the current reaches a point just before the pole starts to saturate.

17. A method as claimed in claim 16, wherein the step of inducing a current in the first electromagnetic coil and a lower or no current in the second electromagnetic coil, comprises the steps of:
   setting the current in both the first electromagnetic coil and the second electromagnetic coil to approximately zero;
   increasing the current in the first electromagnetic coil until either the pole becomes unsaturated or a heat transfer limited current of the first electromagnetic coil is reached; and
   increasing the current in the second electromagnetic coil until the pole becomes unsaturated.

* * * * *